United States Patent [19]
Jenco et al.

[11] Patent Number: 5,717,143
[45] Date of Patent: Feb. 10, 1998

[54] APPARATUS FOR ILLUSTRATING BOLT PRELOADS

[75] Inventors: John M. Jenco, Charlotte, N.C.; E. Stephen Hunt, Arlington, Va.

[73] Assignee: Electric Power Research Institute, Inc., Palo Alto, Calif.

[21] Appl. No.: 664,342

[22] Filed: Jun. 14, 1996

[51] Int. Cl.$^6$ .................................................. F16B 31/02
[52] U.S. Cl. ........................................... 73/761; 73/767
[58] Field of Search ............................ 73/761, 760, 763, 73/768, 814, 795, 767, 862.21–862.23, 862.25, 862.338, 819, 856, 831

[56] References Cited

U.S. PATENT DOCUMENTS

| | | | |
|---|---|---|---|
| 3,098,378 | 7/1963 | Marsh | 73/831 X |
| 3,447,367 | 6/1969 | Taylor | 73/761 X |
| 3,610,032 | 10/1971 | Crispino | 73/819 |
| 3,695,096 | 10/1972 | Kutsay | 73/761 |
| 4,553,124 | 11/1985 | Malicki | 73/761 X |
| 4,823,606 | 4/1989 | Malicki | 73/761 |
| 4,876,895 | 10/1989 | Kao | 73/761 |
| 4,930,951 | 6/1990 | Gilliam | 73/761 X |
| 5,161,594 | 11/1992 | Bolton et al. | 73/761 X |
| 5,339,696 | 8/1994 | Carignan | 73/761 X |
| 5,386,724 | 2/1995 | Das et al. | 73/767 X |

*Primary Examiner*—Elizabeth L. Dougherty
*Attorney, Agent, or Firm*—Flehr Hohbach Test Albritton & Herbert LLP

[57] ABSTRACT

An apparatus for analyzing bolt loads which includes first and second flanges having opposed faces. A plurality of bolts extend through the faces for securing the flanges together. A sensor is carried by each of the bolts for measuring the load experienced by the bolt. An output mechanism is coupled to the sensor for permitting the load on one of the bolts to be analyzed relative to the load on another of the bolts.

19 Claims, 3 Drawing Sheets

5,717,143

APPARATUS FOR ILLUSTRATING BOLT PRELOADS

BRIEF DESCRIPTION OF THE INVENTION

This invention relates to the measurement of bolt loads and more particularly to the measurement of bolt preloads in bolted joints.

BACKGROUND OF THE INVENTION

Bolted joints are used in a variety of pressurized systems such as on pipe flanges, valve bonnets, pump casings and pressure vessels. Bolted joints facilitate physical assembly of systems and permit access to the systems for inspection and maintenance. Gasketed joints must be compressed during assembly to achieve a seal and must be held in compression during plant operation to maintain the seal. The compression in the joint is applied to the gaskets by bolt preload. Significant interaction exists between bolts during tensioning. Specifically, tensioning one bolt can result in decreasing the load on a previously tensioned bolt.

Unfortunately, bolted joints are a major source of leakage in pressure containing systems. Factors found to contribute to such leakage include bolt preload forces which are either too low or too high and preload loss during operation. For example, gaskets can creep under load resulting in the loss of a portion of the bolt preload. Leaking joints can result in plant downtime, increased repair costs, increased contamination and radiation exposure, increased engineering effort and reduced operating efficiency.

Leakage from bolted pressure boundary joints can be reduced by making certain that a recommended load is applied and maintained on the bolts of the joint assembly. Experiments of this type could be performed on test fixtures. Currently available test fixtures, however, do not permit the interactivity between bolts of a joint assembly to be graphically illustrated and quantified throughout the assembly and preload procedure. As can be seen from the foregoing, there is a need for an apparatus for analyzing bolt loads to ensure proper preloading of bolted pressure boundary joints and thus inhibit leakage therein.

OBJECTS AND SUMMARY OF THE INVENTION

The primary object of the present invention is to provide an apparatus for measuring both specific and relative bolt loads in simulated joint assemblies.

Another object of the invention is to provide an apparatus of the above character which permits the load in one bolt to be analyzed as a function of tightening or loosening of other bolts in the joint assembly.

Another object of the invention is to provide an apparatus of the above character in which the relationship between applied torque and resultant preload can be established.

Another object of the invention is to provide an apparatus of the above character in which the relationship between resultant preload and gasket compression can be established.

Another object of the invention is to provide an apparatus of the above character in which the relationship between applied torque and gasket compression can be established.

Another object of the invention is to provide an apparatus of the above character in which the creep between the two flanges of the joint assembly can be monitored.

Another object of the invention is to provide an apparatus of the above character in which the creep in a gasket disposed between the flanges of the joint assembly can be monitored.

Another object of the invention is to provide an apparatus of the above character in which the load in the bolts of the joint assembly can be observed as a function of the creep in the flanges and/or gasket.

Another object of the invention is to provide an apparatus of the above character in which the load in a nut and bolt assembly tightened with a given torque can be analyzed as a function of washer types, lubricants, alignment, thread wear, torquing cycles and torquing techniques.

These and other objects are achieved by an apparatus for analyzing bolt loads which includes first and second flanges having opposed faces. A plurality of bolts extend through the faces for securing the flanges together. A sensor is carried by each of the bolts for measuring the load experienced by the bolt. An output mechanism is coupled to the sensing means for permitting the load on one of the bolts to be analyzed relative to the load on another of the bolts.

Additional objects and features of the invention will appear from the following description from which the preferred embodiments are set forth in detail in conjunction with the accompanying drawings.

DETAILED DESCRIPTION OF THE INVENTION

Reference will now be made in detail to the preferred embodiments of the invention which are illustrated in the accompanying figures. The description of the embodiments of the invention will be followed by a discussion of their operation.

Figure 1:
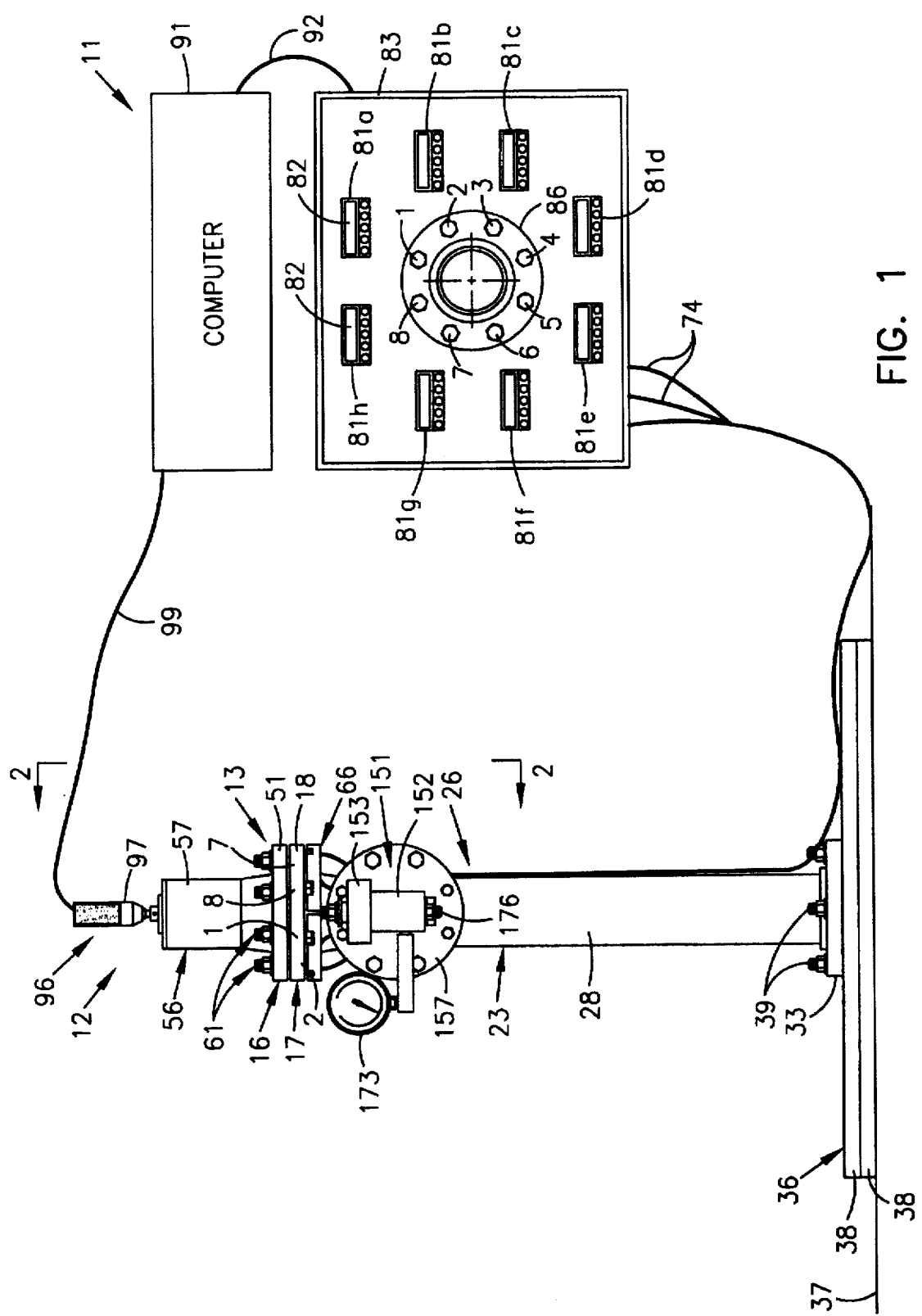
FIG. 1 is a side elevational view of an embodiment of the invention that analyzes bolt loads.

Apparatus 11 of the present invention is for measuring resultant bolt preloads and relative gasket compression in a bolted pressure boundary joint assembly such as of the type utilized in the power plant industry (See FIG. 1). The apparatus 11 includes a test fixture 12 having a joint assembly 13 formed from two annular flanges. Specifically, joint assembly 13 includes a first or upper raised face flange 16 and a second or lower raised face flange 17.

Figure 2:
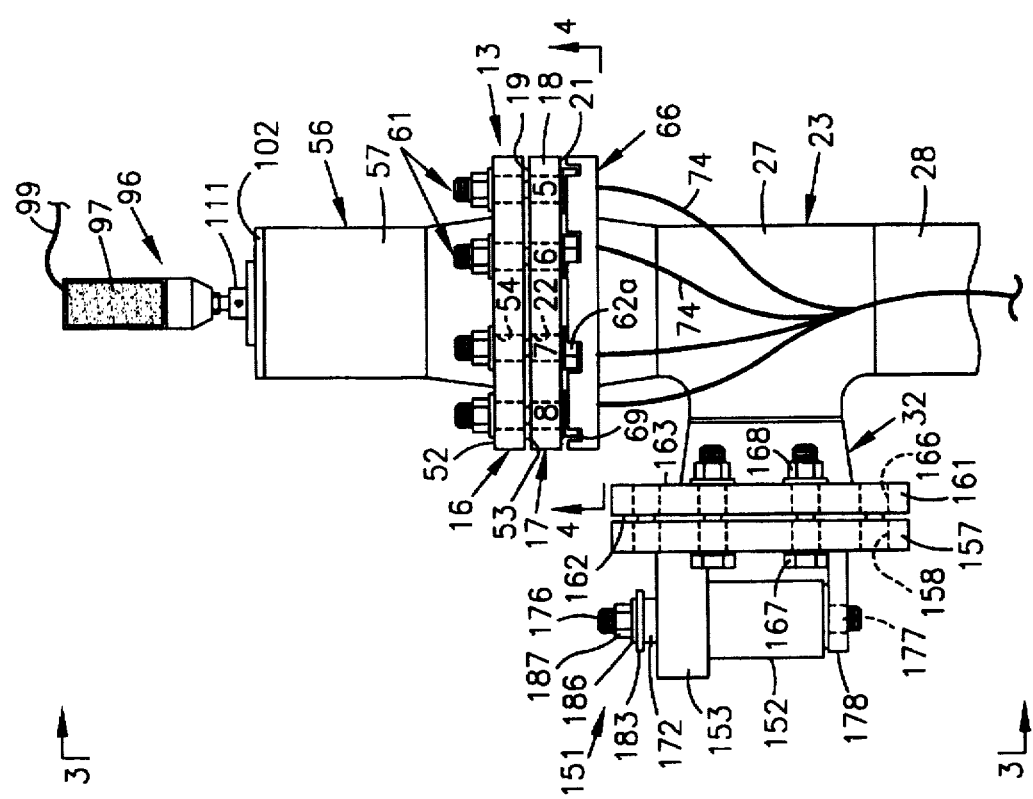
FIG. 2 is a side elevational view of the apparatus of FIG. 1 taken along the line 2—2 of FIG. 1.
Figure 5:
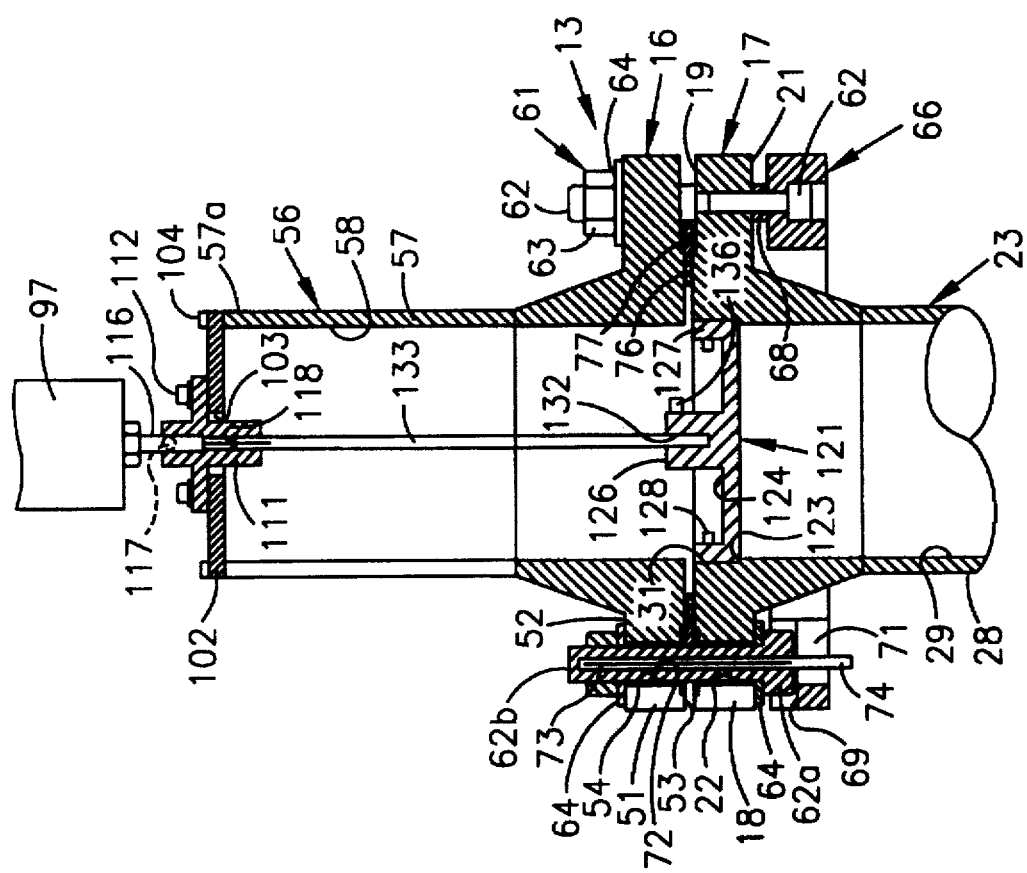
FIG. 5 is a cross-sectional view of the apparatus of FIG. 2 taken along the line 5—5 of FIG. 4.

Lower annular flange 17 is a four inch weld neck flange, Class 150, and has a circular rim 18 formed in part by a planar surface 19 and an opposite planar surface 21 extending in a direction parallel to surface 19 (see FIGS. 2 and 5). A plurality of eight bores or flange holes 22 extend perpendicularly through surfaces 19 and 21. The holes 22 are equally spaced-apart around rim 19 at 45° separation angles.

Lower flange 17 is part of a pipe section 23 which serves as a column in a support fixture or stand 26 as illustrated in FIGS. 1 and 2. Pipe section 23 is made from any suitable material such as Schedule 40 carbon steel and further includes a four inch straight tee 27, standard weight, having its upper end welded or otherwise suitably joined to flange 17 and its opposite lower end welded or otherwise suitably joined to the upper end of a four inch diameter pipe 28 having a length of approximately 25 inches. The central portion of tee 27 is welded or otherwise suitably joined to a four inch weld neck flange 32, Class 150. Tubular pipe section 23 has a central passageway 29 extending through pipe 28 to a central opening 31 in lower flange 17. The lower end of pipe 28 is welded or otherwise suitably secured to a four inch lap flange 33, Class 150. Support fixture 26 further includes a planar base 36 for resting on any suitable horizontal surface 37. Base 36 is made from first and second one inch thick sheets 38 made from a suitable material such as exterior plywood. Sheets 38 are generally square in shape and have a side dimension of approximately 48 inches. Lap flange 33 is secured to base 36 by any suitable means such as four nut and bolt assemblies 39 which are circumferentially spaced-apart around the flange 33 at approximately 90° intervals. Fixture 26 serves to support flanges 16 and 17 in a generally horizontal position above support surface 37.

Upper annular flange 16 consists of a four inch weld neck flange, Class 150, made from Schedule 40 carbon steel or any other suitable material (see FIGS. 2 and 5). Flange 16 has a rim 51 substantially identical to rim 18 and formed in part by planar top and bottom surfaces 52 and 53. A plurality of eight bores or flange holes 54 extend perpendicularly through surfaces 21 and 53 in alignment with holes 22 in lower flange 17. Upper flange 16 is part of a top section 56 which further includes a four inch diameter Schedule 40 carbon steel pipe 57 having a lower end welded or otherwise suitably secured to flange 16. Pipe 57 has an open top and 57a. The tubular top section 56 is provided with a central passageway 58 extending through upper flange 16 and top end 57a.

A plurality of nut and bolt assemblies 61 are provided in joint assembly 13 for fastening together upper and lower flanges 16 and 17. As illustrated in FIGS. 1–5, a plurality of at least four and as shown eight nut and bolt assemblies 61 are included in test fixture 12. Each of the nut and bolt assemblies 61 includes any suitable instrumented threaded bolt 62 such as a standard internally gauged hex head cap screw of the type sold by Strainseft of West Conshohocken, Pa. More specifically, bolts 62 are from Strainsert's Steel Alloy SXS series and have a recommended maximum service temperature of 300° F. Bolts 62 each have a bolt head 62a at one end and a threaded end portion 62b at the other end. Each assembly 61 further includes a nut 63 and first and second hardened steel washers 64. As shown in FIG. 5, bolts 62 extend upwardly through holes 22 in lower rim 18 and then holes 54 in upper rim 51 so as to be circumferentially spaced-apart around flanges 16 and 17. A washer 64 is disposed between each bolt head 62a and bottom surface 21 of lower flange 17. A nut 63 threadedly engages exposed upper end 62b of each bolt 62. A second washer 64 is disposed between each nut 63 and top surface 53 of the upper flange 16. It should be appreciated that bolts offering service temperatures other than 300° F. could be provided and be within the scope of the present invention.

Figure 4:
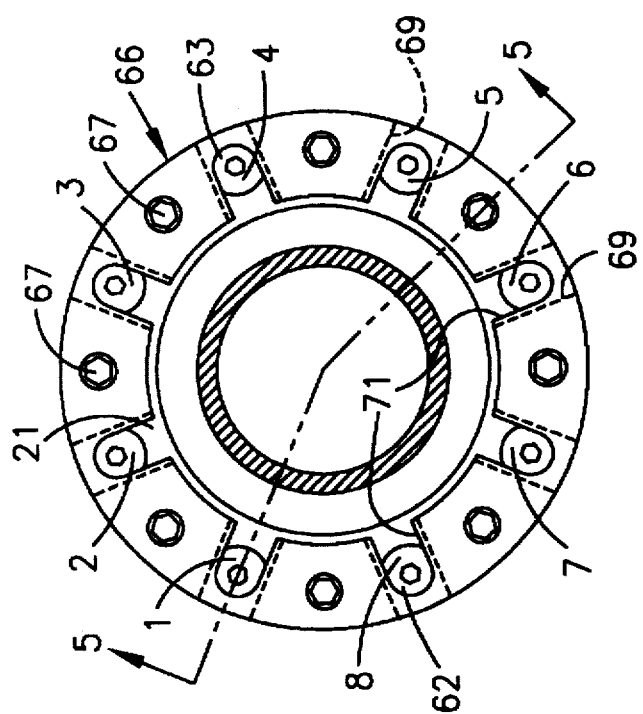
FIG. 4 is a cross-sectional view of the apparatus of FIG. 2 taken along the line 4—4 of FIG. 2.

A ring-shaped capture plate 66 is mounted to lower rim 18 by a plurality of eight circumferentially spaced-apart fasteners or cap screws 67 (see FIGS. 1, 4 and 5). Spacers 68 are disposed between plate 66 and rim 18. Capture plate 66 includes a plurality of eight radially-extending slots 69 for snugly receiving bolt heads 62a so as to prevent bolts 62 from turning as nuts 63 are tightened thereon. An opening 71 extends through the bottom of plate 66 into each slot 69.

Sensing or strain gauge means is carried by each bolt 62 for measuring the axial load experienced by the bolt when nut 63 is torqued tightly against upper flange 16. As illustrated in FIG. 5, each bolt 62 is provided with a central bore 72 extending axially through head 62a into the threaded portion 62b of the bolt. A strain gauge wire or sensor 73 extends through each bore. Sensor 73 is secured at each end to the inside of bolt 62 by glue or any other suitable means. A connector wire or lead 74 is electrically coupled to the lower end of sensor 73 and extends from the bolt through opening 71 in capture plate 66.

Joint assembly 13, as shown in FIG. 5, includes a sealing member in the form of a conventional spiral wound circular gasket 76 disposed between opposed surfaces or faces 19 and 21. In addition, a metal outer ring in the form of compression stop 77 is disposed between the surfaces 19 and 21. The stop 77 extends circumferentially around gasket 76 and serves to center the gasket within the bolt circle and to limit the maximum compressive load which can be applied to the resilient active portion of gasket 76. It should be appreciated that a joint assembly without gasket 76 or stop 77 or a joint assembly with an internal stop ring or compression stop could be provided and be within the scope of the present invention.

An output mechanism which includes a plurality of conventional strain meters 81a–h is included within the means of apparatus 11 for permitting the axial loads experienced by bolts 62 to be analyzed (see FIG. 1). Strain or panel meters 81 can be of any conventional type such as Model No. INFCS sold by Newport Electronics, Inc. of Santa Ana, Calif. A strain meter 81a–h is electrically coupled by connector lead 74 to each strain gauge sensor 73 and each meter 81 includes a display 82 providing a readout of the load experienced by the respective bolt 62. It should be appreciated, however, that strain meters providing a digital output can be provided and be within the scope of the present invention. Furthermore, sensors 73 can be connected to meters 81 by an optic fiber or other suitable means as an alternative to electrical lead 74.

Strain meters 81a–h are carried by an enclosure or housing 83 in a circular pattern which corresponds to the bolt pattern in joint assembly 13. Bolts 62 in joint assembly 13 are sequentially numbered around flanges 16 and 17 and the respective strain meters 81a–h are similarly ordered in the circular pattern on housing 83. Numbering is included on housing 83 for facilitating location of specific meters 81a–h. In the embodiment illustrated in FIGS. 1–3, bolts 62 are sequentially numbered from one to eight around flanges 16 and 17 and artwork 86 is provided which includes sequential numbering from one to eight for easily identifying a strain meter 81a–h corresponding to a particular bolt 62.

A computer 91 is further included within the output mechanism of apparatus 11 and serves as means for recording, processing and analyzing information obtained from strain gauge sensors 73. The computer 91 is electrically connected by cable 92 to housing 83 and strain meters 81 therein. It should be appreciated that an apparatus 11 having only meters 81 or computer 91 could be provided and be within the scope of the present invention.

Means 96 is included within apparatus 11 for measuring the relative axial movement between upper and lower flanges 16 and 17 (see FIGS. 2 and 5). Measuring or monitoring means 96 includes a conventional depth gauge such as digital depth gauge 97 carried by upper flange 16. Gauge 92 includes a suitable display such as LED display 98. Specifically, gauge 92 is sold by Mitutoyo of Japan as Model No. 6389878. The gauge 92 is coupled by any suitable means such as an electrical or optical cable 99 to computer 91 for permitting the output of the gauge to be stored, processed and analyzed by the computer 91. A cover plate 102 having a central opening 103 therein is mounted to top end 57a of pipe 57 by a plurality of fasteners or socket head cap screws 104. A tubular fitting 111 extends through central opening 103 and has a flange portion which is secured to cover plate 102 by a plurality of bolts or socket head cap screws 112. Cover plate 102 and fitting 111 are each made from any suitable material such as steel. A central bore 113 extends axially through fitting 111. Depth gauge 97 has a depending tube 116 which extends into the upper portion of bore 113 and is secured therein by a set screw 117 or any other suitable means. Set screw 117 extends through the side of fitting 111 to engage tube 116 disposed therein. A cylindrical plunger 118 is included within depth gauge 97 and slidably extends from tube 116 thereof.

Measuring means 96, as shown in FIG. 5, has a portion in the form of a plate member or support plate 121 rigidly connected to lower flange 17. Plate 121 is made from steel or any other suitable material and extends across central opening 31 of flange 17. An annular recess 123 is provided in flange 17 at central opening 31 for aligning the upper surface of support plate 121 generally flush with flange surface 19. An annular cavity 124 extends through the top of support plate 121 to form a central hub 126 and an annular periphery or rim 127 in the support plate. A plurality of circumferentially disposed fasteners or set screws 128 extend through rim 127 into lower flange 117 for securing the support plate to the flange. Hub 126 is formed with a central bore 132 therein in axial alignment with central bore 113 of tubular fitting 111. A cylindrical rod 133 has a lower end portion disposed within central bore 132 and secured therein. At least one set screw 136 extends through hub 131 to engage the rod 133. The upper end of rod 133 extends through central passageway 58 of pipe 57 and slidably seats within the bottom of bore 113 in engagement with plunger 118.

Figure 3:
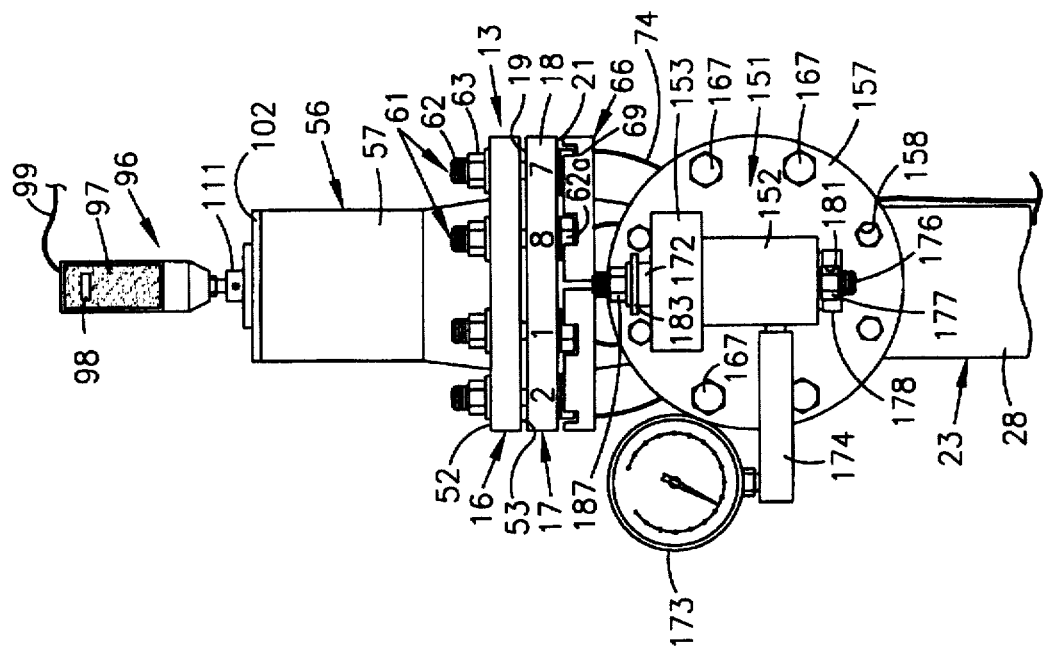
FIG. 3 is a side elevational view of the apparatus of FIG. 2 taken along the line 3—3 of FIG. 2.

A secondary load measuring apparatus in the form of load cell 151 is included in test fixture 12 (see FIGS. 1–3). Load cell 151 includes a conventional hydraulic cylinder 152 of any suitable type such as Model No. RCH-121 manufactured by Enerpac of Milwaukee, Wis. The hydraulic cylinder 152 is secured to a mounting flange 153 which in turn is bolted or otherwise suitably secured to a circular plate or disk 157. A plurality of eight bores 158 are equally spaced apart around the periphery of disk 157. Vertical flange 32 is substantially identical to lower flange 17 and has a circular rim 161 substantially identical to rim 18 described above. The rim 161 is formed with an outer planar surface 162 and an opposite inner planar surface 163. A plurality of eight bores or bolt holes 166 extend perpendicularly through surfaces 162 and 163 in alignment with bores 158 of disk 157. Three ⅝ inch threaded bolts 167 extend through three sets of bores 166 and 158 for securing disk 157 to vertical flange 32. A nut 168 is threadedly mounted to the end of each bolt 167. A hollow piston 172 is slidably disposed within hydraulic cylinder 152 and a conventional hydraulic gauge 173 is coupled to hydraulic cylinder 152 by means of a conventional gauge adapter 174. A suitable gauge 173 can be the hydraulic gauge sold by Enerpac as Model No. GF-120, while a suitable adapter 174 can be the gauge adapter sold by Enerpac as Model No. GA-2.

In the embodiment of load cell 151 shown in FIGS. 2 and 3, an elongated stud 176 having opposite threaded ends extends through piston 172 and hydraulic cylinder 152. A fastener in the form of nut 177 threadedly engages the bottom end of stud 176 and abuts the lower end of cylinder 152. A retainer plate 178 is welded or otherwise suitable joined to disk 157 and has a socket 181 for nonrotatably receiving nut 177. The upper end of stud 176 extends through a flange simulator plate 183 resting on the top end of hollow piston 172 and a washer 186 sits atop plate 183. A second fastener in the form of nut 187 is threaded about the top end of stud 176 and engages washer 186. It should be appreciated that a bolt can be substituted for stud 176 and be within the scope of the present invention. If the bolt is not sufficiently long so as to permit its extension through piston 172 and hydraulic cylinder 152, an extension stud can be threadedly or otherwise attached to the forward end of the bolt.

In operation and use, apparatus 11 is assembled by attaching load cell 151 to vertical flange 32 with bolts 167 and corresponding nuts 168. The upper exposed end of piston 172 faces upwardly as shown in FIGS. 1–3. Flange simulator plate 183 is installed between piston 172 and washer 186 to simulate a typical flange surface, such as a carbon steel flange surface, and prevent damage to the upper end of piston 172. Retainer plate 178 precludes rotation of lower nut 177 as upper nut 187 is tightened about stud 176.

The eight strain gauged bolts 62 are each calibrated with their respective panel meter 81a–h in a conventional manner and then installed in lower flange 17 with washers 64. Bolts 62 and flange holes 22 are each numbered one to eight as illustrated in FIGS. 2–4 to facilitate placement of the proper bolts 62 in the proper hole 22. Capture plate 66 is placed under bolt heads 62a and attached to lower flange 17 with cap screws 67 and, if necessary, spacers 68. Once it is confirmed that the capture plate is supporting all of bolts 62 equally, screws 67 are tightened to a snug tight condition. Each bolt 62 is then connected to the back of the related strain meter 81a–h by a lead 74. Following warmup, each panel meter 81 is reset to zero by pushing the TARE button thereon.

Top section 56 and measuring means 96 are now connected to support stand 26. Specifically, support plate 121 is seated in position within annular recess 123 and secured to lower flange 17 by set screws 128. Gasket 76 is placed on the top of lower flange 17 and upper flange 16 is then placed on the top of the gasket. A washer 64 is installed on the threaded upper end 62b of each bolt 62 and a nut 63 is tightened to a finger tight condition on the bolt 62. Cover plate 102 is secured to central opening 103 with screws 104. Tubular fitting 111 is placed over the top of rod 113 and secured at its flange portion to plate 121 with screws 112. Depth gauge 97 is then set to zero.

Apparatus 11 can now be used in a variety of experiments relating to the preload of bolts 62. A first group of experiments utilize load cell 151. In one such experiment, participants can attempt to replicate the amount of torque placed upon nut 187 threaded to the upper end of stud 176 by a selected individual. The variation or scatter in the loads so developed by the participants will show that "mechanic's judgment" is not a good way to achieve a reproducible load. In another experiment, the amount of axial force produced in stud 176 by the application of a predetermined torque can be measured in a series of tests incorporating various combinations of washers, including no washers, type of lubricant, amount of lubricant, location where the lubricant is applied, misalignment of flange simulator plate 183 relative to piston 172, and nuts, both installed correctly and incorrectly. These experiments will show that all of the above factors can affect the load developed in a stud or bolt being preloaded. In yet further experiments where the same torque is applied to a variety of nuts 63 and bolts 62, it can be shown that with various bolt materials such as carbon steel and stainless steel, thread corrosion, thread damage and repeated tensioning of the same bolt can affect the amount of preload developed in bolts 62.

Simulated joint assembly 13 with strain gauged bolts 62 connected to the array of panel meters 81a–h permit other experiments to be performed with apparatus 11. In one such experiment, the relationship between the torque and the preload provided in joint assembly, including the interactivity within the bolt circle of flanges 16 and 17, can be explored. In this experiment, joint assembly 13 is assembled using a desired torquing procedure. The reading on depth gauge 97 indicates whether the procedure produced the desired compression in gasket 76 and the array of panel meters 81a–h indicate whether the target bolt preload for a given applied torque has been achieved, and whether it is uniform around flanges 16 and 17. Meters 81 and gauge 97 permit other phenomena to be observed during this experiment. For example, the readings on meters 81a–h indicate how the tightening or untightening of one of bolts 62 affects other bolts 62. Typically, the tightening of one bolt 62 causes the load in adjacent bolts 62 in joint assembly 13 to decrease. However, it has also been found that tensioning one bolt can increase the load on a previously tensioned bolt. For example, the tensioning of a second bolt in a joint assembly can cause an increase in the load of the bolt tensioned first in a typical star pattern tensioning procedure. Depth gauge 97 further permits participants to observe the amount that joint assembly 13 and particularly gasket 76 therein further compress over time after a preload is placed thereon. This compression or creep causes the load on bolts 62 to also decrease with time. The participants can compare creep and related preload in a joint assembly which includes a gasket similar to gasket 76 and in a joint assembly having no gasket to confirm that most of the creep in a joint results from the gasket. The load versus compression characteristics of various types of gaskets can be determined in other experiments by sequentially increasing the torque in all eight bolts 62 and measuring the resultant average bolt load and gasket compression.

Panel meters 81a–h and depth gauge 97 also permit the relative effectiveness of various bolt tightening patterns, sequences and methodologies to be evaluated. For example, in one experiment participants can torque nuts 63 to a recommended gasket compression and uniform bolt preload using "mechanic's judgment". In another experiment, the participants can assemble joint assembly 13 using "controlled compression" by torquing nuts 62 until the compression of gasket 76 reaches a desired amount determined by the participants using dial indicator calipers and feeler gauges. Meters 81 and gauge 97 permit an independent determination as to how close the participants came in these experiments to the desired gasket compression and uniform bolt preload around flanges 16 and 17.

Meters 81a–h allow the individual load on each of bolts 62 to be observed over time. The circular arrangement of the meters 81a–h, which corresponds to the circular arrangement and order of bolts 62 in flanges 16 and 17, permits the participants to easily correlate meter readings to the bolts in joint assembly 13. Depth gauge 97 allows participants to continuously monitor the relative movement between upper and lower flanges 16 and 17 during torquing of bolts 62 and thereafter. The information received by meters 81 and depth gauge 97 can be stored within computer 91 for further processing and analysis.

Although bolts 62 have been shown for use in upper and lower flanges 16 and 17, it should be appreciated that strain gauged bolts 62 can be used with vertical flange 32 and be within the scope of the present invention. It should be further appreciated that bolts 62 can be used in an in situ flange assembly and be within the scope of the invention.

From the foregoing, it can be seen that an apparatus has been provided for measuring both specific and relative bolt loads in simulated or other joint assemblies. The apparatus permits the load in each bolt of the joint assembly to be measured in real time and further permits the load in one or more bolts to be analyzed relative to one or more other bolts in the joint assembly. More specifically, the apparatus permits to load in one or more bolts to be analyzed as a function of tightening or loosening of one or more other bolts in the joint assembly. The relationship between applied torque and resultant preload, resultant preload and gasket compression and applied torque and gasket compression can be established with the apparatus. Creep between the two flanges of the joint assembly or in a gasket disposed between these flanges can be monitored. The load in the bolts of the joint assembly can be observed as a function of the creep in the flanges and/or gasket. The apparatus further permits the load in a nut and bolt assembly tightened with a given torque to be analyzed as a function of washer types, lubricants, alignment, thread wear, torquing cycles and torquing techniques. As such, the apparatus measures the preload in a specific bolt and illustrates the torque/preload relationship in the bolt, the preload relationship of fasteners in a fastened joint, the relationship of gasket compression to applied torque as a function of resultant preload, and the relative effectiveness of various lubricants and/or lubrication techniques to resultant bolt preload.

What is claimed is:

1. An apparatus for analyzing bolt preloads in a pipe joint assembly comprising first and second pipe flanges having outer peripheries with opposed faces, each of the flanges having a passageway for carrying fluid extending through the flange and the outer periphery of the flange, a plurality of spaced-apart bolts extending through the opposed faces of the outer peripheries for securing the flanges together, a sensor carried by each of the bolts for measuring the load experienced by the bolt and an output mechanism coupled to the sensors for permitting the load on one of the bolts to be analyzed as a function of a change in preload on another of the bolts.

2. The apparatus of claim 1 wherein the sensor carried by each of the bolts includes a strain gauge carried by each of the bolts.

3. The apparatus of claim 1 wherein the output mechanism includes a meter coupled to each sensor for displaying the load experienced by the bolt.

4. The apparatus of claim 3 wherein the bolts are arranged in a pattern and the meters are arranged in a pattern corresponding to the pattern of the bolts.

5. The apparatus of claim 1 together with a sealing member disposed between the opposed faces of the first and second flanges.

6. The apparatus of claim 5 together with means carried by the first flange and having a portion carried by the second flange for measuring relative movement of the flanges.

7. The apparatus of claim 1 wherein the first and second flanges are each generally annular and wherein the opposed faces are each planar.

8. The apparatus of claim 7 wherein the plurality of bolts consists of at least four bolts.

9. The apparatus of claim 8 wherein the plurality of bolts consists of eight bolts spaced circumferentially around the flanges.

10. The apparatus of claim 1 together with a support fixture for carrying the first and second flanges in a generally horizontal position above a horizontal surface.

11. The apparatus of claim 10 wherein the support fixture includes a column having an end formed as the first flange.

12. The apparatus of claim 1 wherein the output mechanism consists of an output mechanism coupled to the sensors for permitting the load on one of the bolts to be analyzed as a function of an increase or decrease in the preload on another of the bolts.

13. An apparatus for analyzing bolt loads in a joint assembly comprising first and second annular flanges, a gasket disposed between the flanges for providing a seal therebetween, a plurality of circumferentially spaced-apart bolt and nut assemblies extending through the flanges for fastening the flanges together, the first and second flanges and the bolt and nut assemblies and the gasket forming the joint assembly, a sensor carried by each bolt of the bolt and nut assemblies for measuring the load experienced by the bolt, an output mechanism coupled to the sensor for permitting the load on one of the bolts to be analyzed relative to the load on another of the bolts and means carried by the joint assembly for measuring creep in the gasket.

14. The apparatus of claim 13 wherein the first and second flanges have opposed planar surfaces, a fixture for supporting the planar surfaces in a horizontal position.

15. The apparatus of claim 14 wherein the measuring means includes a depth gauge.

16. An apparatus for analyzing bolt preloads in a pipe joint assembly comprising first and second annular pipe flanges having outer peripheries with opposed planar faces, each of the flanges having a passageway for carrying fluid extending through the flange and the outer periphery of the flange, a gasket disposed between the opposed faces of the flanges, a plurality of circumferentially spaced-apart bolt and nut assemblies extending through the flanges for securing the flanges together and for compressing the gasket to inhibit leakage between the flanges, a strain gauge carried by each bolt of the bolt and nut assemblies for measuring the axial load experienced by the bolt and a display coupled to each strain gauge for viewing the amount of said axial load to permit the load on one of the bolts to be analyzed as a function of a change in preload applied to another of the bolts.

17. The apparatus of claim 16 together with means rigidly carried by the first flange and having a portion rigidly connected to the second flange for monitoring compression of the gasket.

18. The apparatus of claim 17 wherein the portion includes a plate extending across the passageway of the second flange and having a periphery, fasteners circumferentially disposed about the periphery for securing the plate to the second flange.

19. The apparatus of claim 16 together with a computer coupled to the strain gauges and the monitoring means.

* * * * *